US010408062B2

(12) United States Patent
Brzek et al.

(10) Patent No.: US 10,408,062 B2
(45) Date of Patent: Sep. 10, 2019

(54) IMPINGEMENT SYSTEM FOR AN AIRFOIL

(71) Applicant: General Electric Company, Schenectady, NY (US)

(72) Inventors: Brian Gene Brzek, Clifton Park, NY (US); James Fredric Wiedenhoefer, Clifton Park, NY (US)

(73) Assignee: General Electric Company, Schenectady, NY (US)

( * ) Notice: Subject to any disclaimer, the term of this patent is extended or adjusted under 35 U.S.C. 154(b) by 507 days.

(21) Appl. No.: 15/235,986

(22) Filed: Aug. 12, 2016

(65) Prior Publication Data

US 2018/0045055 A1  Feb. 15, 2018

(51) Int. Cl.
*F01D 5/18* (2006.01)
*F01D 25/12* (2006.01)
(Continued)

(52) U.S. Cl.
CPC ............. *F01D 5/186* (2013.01); *F01D 5/189* (2013.01); *F01D 9/02* (2013.01); *F01D 9/065* (2013.01);
(Continued)

(58) Field of Classification Search
CPC .......... F01D 5/186; F01D 5/188; F01D 25/12; F01D 9/02; F01D 9/065; F01D 5/189;
(Continued)

(56) References Cited

U.S. PATENT DOCUMENTS 3,191,908 A * 6/1965 Petrie ...................... F01D 5/187
416/96 R
3,606,573 A 9/1971 Emmerson et al.
(Continued)

FOREIGN PATENT DOCUMENTS

| DE | 2703815 A1 * | 2/1979 | ............. F01D 5/188 |
| EP | 2489837 A1 * | 8/2012 | ............. F01D 5/188 |
| EP | 2607624 A1 | 6/2013 | |

OTHER PUBLICATIONS

Carcassi et al., "Heat Transfer and Pressure Drop Evaluation in Thin Wedge-Shaped Trailing Edge", Heat Transfer, pp. 111-122, 2003.
(Continued)

*Primary Examiner* — J. Todd Newton
(74) *Attorney, Agent, or Firm* — Armstrong Teasdale LLP

(57) ABSTRACT

An airfoil includes an exterior wall, a triple trailing edge pin bank, and an impingement system. The exterior wall defines a first interior space. The exterior wall also includes a pressure sidewall and a suction sidewall. The impingement system is disposed within the first interior space. The impingement system includes an interior wall which defines a second interior space a plurality of impingement holes configured to channel a flow of coolant from the second interior space to the first interior space. The interior wall has an impingement hole density with a varying hole density pattern. The impingement system also includes dividing walls extending from the interior wall to the exterior wall. The interior wall, exterior wall, and dividing walls define a first and second zone coupled in flow communication. The impingement hole density is configured to separately meter flow to the first and second zones.

14 Claims, 5 Drawing Sheets

(51) Int. Cl.
*F01D 9/02* (2006.01)
*F01D 9/06* (2006.01)
*F02C 3/04* (2006.01)

(52) U.S. Cl.
CPC ............... *F01D 25/12* (2013.01); *F02C 3/04* (2013.01); *F05D 2220/32* (2013.01); *F05D 2220/3212* (2013.01); *F05D 2240/122* (2013.01); *F05D 2240/304* (2013.01); *F05D 2240/35* (2013.01); *F05D 2260/201* (2013.01); *F05D 2260/202* (2013.01); *Y02T 50/676* (2013.01)

(58) Field of Classification Search
CPC .... F02C 3/03; F05D 2220/32; F05D 2240/35; F05D 2220/3212; F05D 2260/202; F05D 2240/304; F05D 2240/122; F05D 2260/201
USPC ........................................................ 60/806
See application file for complete search history.

(56) References Cited

U.S. PATENT DOCUMENTS

| | | | | |
|---|---|---|---|---|
| 4,056,332 A * | 11/1977 | Meloni | | F01D 5/188 415/115 |
| 4,063,851 A | 12/1977 | Weldon | | |
| 4,297,077 A * | 10/1981 | Durgin | | F01D 5/189 416/97 R |
| 4,403,917 A * | 9/1983 | Laffitte | | F01D 5/188 415/115 |
| 4,407,632 A * | 10/1983 | Liang | | F01D 5/187 415/115 |
| 4,515,523 A * | 5/1985 | North | | F01D 5/187 415/115 |
| 4,697,985 A * | 10/1987 | Suzuki | | F01D 5/189 415/115 |
| 5,100,293 A * | 3/1992 | Anzai | | F01D 5/186 416/96 A |
| 5,193,980 A | 3/1993 | Kaincz et al. | | |
| 5,591,002 A | 1/1997 | Cunha et al. | | |
| 5,702,232 A * | 12/1997 | Moore | | F01D 5/186 416/95 |
| 5,743,708 A | 4/1998 | Cunha et al. | | |
| 6,000,908 A | 12/1999 | Bunker | | |
| 6,206,638 B1 | 3/2001 | Glynn et al. | | |
| 6,238,183 B1 * | 5/2001 | Williamson | | F01D 5/189 416/96 A |
| 6,318,963 B1 * | 11/2001 | Emery | | F01D 5/186 416/96 A |
| 6,506,013 B1 | 1/2003 | Burdgick et al. | | |
| 6,530,745 B2 * | 3/2003 | Ciani | | F01D 5/186 415/115 |
| 6,726,444 B2 | 4/2004 | Zhao et al. | | |
| 6,974,308 B2 | 12/2005 | Halfmann et al. | | |
| RE39,479 E * | 1/2007 | Tressler | | F01D 5/189 415/115 |
| 7,497,655 B1 * | 3/2009 | Liang | | F01D 5/189 415/1 |
| 7,556,476 B1 * | 7/2009 | Liang | | F01D 5/188 415/115 |
| 7,568,882 B2 | 8/2009 | Brittingham et al. | | |
| 7,625,180 B1 * | 12/2009 | Liang | | F01D 5/186 29/889.2 |
| 7,690,894 B1 | 4/2010 | Liang | | |
| 7,819,169 B2 | 10/2010 | Pietraszkiewicz et al. | | |
| 7,871,246 B2 | 1/2011 | Liang | | |
| 8,043,057 B1 | 10/2011 | Liang | | |
| 8,043,060 B1 | 10/2011 | Liang | | |
| 8,057,183 B1 * | 11/2011 | Liang | | F01D 5/187 416/96 A |
| 8,096,770 B2 * | 1/2012 | Liang | | F01D 5/186 415/115 |
| 8,162,609 B1 | 4/2012 | Liang | | |
| 8,182,203 B2 | 5/2012 | Hada et al. | | |
| 8,231,329 B2 * | 7/2012 | Benjamin | | F01D 5/188 415/115 |
| 8,562,295 B1 | 10/2013 | Liang | | |
| 9,011,077 B2 * | 4/2015 | Vitt | | F01D 5/186 415/115 |
| 9,011,079 B2 | 4/2015 | Coign et al. | | |
| 9,169,733 B2 | 10/2015 | Kerber et al. | | |
| 9,267,381 B2 | 2/2016 | Morris et al. | | |
| 9,297,261 B2 | 3/2016 | Otero | | |
| 9,863,255 B2 * | 1/2018 | Mugglestone | | F01D 5/189 |
| 2004/0009066 A1 * | 1/2004 | Soechting | | F01D 5/186 416/96 R |
| 2005/0232769 A1 | 10/2005 | Lee et al. | | |
| 2007/0243065 A1 * | 10/2007 | Devore | | F01D 5/189 416/97 R |
| 2007/0258814 A1 | 11/2007 | Metrisin et al. | | |
| 2010/0221121 A1 | 9/2010 | Liang | | |
| 2010/0247290 A1 * | 9/2010 | Hada | | F01D 5/189 415/115 |
| 2014/0093379 A1 * | 4/2014 | Tibbott | | F01D 5/189 416/224 |
| 2014/0093390 A1 * | 4/2014 | Pointon | | F01D 5/186 416/97 R |
| 2014/0147287 A1 * | 5/2014 | Xu | | F01D 5/186 416/96 R |
| 2014/0219788 A1 | 8/2014 | Nilsson | | |
| 2015/0147158 A1 | 5/2015 | Wang et al. | | |
| 2015/0345397 A1 * | 12/2015 | Bunker | | F02C 7/18 416/95 |
| 2017/0030199 A1 * | 2/2017 | Barker | | F01D 5/189 |
| 2017/0101932 A1 * | 4/2017 | Stover | | F01D 5/189 |
| 2017/0175578 A1 * | 6/2017 | Propheter-Hinckley | | F01D 9/02 |
| 2018/0045056 A1 * | 2/2018 | Wiedenhoefer | | F01D 5/186 |

OTHER PUBLICATIONS

Bunker et al., "In-Wall Network (Mesh) Cooling Augmentation of Gas Turbine Airfoils", Heat Transfer, pp. 1007-1018, 2004.
Robert F Bergholz, "Preliminary Design Optimization of Impingement Cooled Turbine Airfoils", Heat Transfer, vol. 4, pp. 675-689, Jun. 9-13, 2008.
Terzis et al., "Detailed Heat Transfer Distributions of Narrow Impingement Channels for Cast-In Turbine Airfoils", Journal of Turbomachinery, vol. 136, Issue: 9, pp. 9, Jun. 3, 2014.

* cited by examiner

IMPINGEMENT SYSTEM FOR AN AIRFOIL

BACKGROUND

The field of the disclosure relates generally to turbomachinery and, more specifically, to systems for removing heat from turbine components.

In at least some known gas turbine engines, air is pressurized in a compressor and mixed with fuel in a combustor for generating a stream of high-temperature combustion gases. Energy is extracted from the gas stream in a turbine which powers a mechanical load. During operation of the gas turbine engine, various hot gas path components are subjected to the high-temperature gas stream, which can induce wear in the hot gas path components. Generally, higher temperature gases increase performance, efficiency, and power output of the gas turbine engine. Thus, at least some known hot gas path components are cooled to facilitate the gas turbine engine to operate with the increased high-temperature combustion gas streams.

Some known hot gas path components include an airfoil with a cooling system, wherein air, typically bleed air extracted from the compressor, is forced through internal cooling passages defined within the airfoil. The air is then discharged through cooling holes or passages located at an outer surface of the airfoil to transfer heat away from the hot gas path component. This forced air-cooling facilitates the hot gas path components functioning in the high-temperature gas stream. At least some known cooling systems increase a sidewall thickness of the airfoil to increase cooling air flow velocity through the trailing edge to facilitate heat transfer therefrom. However, increasing the sidewall thickness of the airfoil also increases thermal resistance of the surfaces to be cooled. At least some other known cooling systems increase the cooling air flow velocity by extracting additional bleed air from the compressor. However, extracting additional bleed air reduces gas turbine engine efficiency.

BRIEF DESCRIPTION

In one aspect, an airfoil is provided. The airfoil includes an exterior wall, a root portion, a tip portion, a triple trailing edge pin bank, and an impingement system. The exterior wall includes an inner surface, an outer surface, and a plurality of exterior wall regions and defines a first interior space. The exterior wall also includes a pressure sidewall and a suction sidewall coupled to the pressure sidewall. The suction sidewall and the pressure sidewall define a leading edge and a trailing edge opposite the leading edge. The tip portion is opposite the root portion. The triple trailing edge pin bank is disposed within the first interior space. The impingement system is disposed within the first interior space and is configured to channel a coolant stream to the exterior wall. The impingement system includes an interior wall substantially parallel to the exterior wall. The interior wall defines a second interior space. The interior wall further defines a plurality of impingement holes configured to channel a flow of coolant from the second interior space to the first interior space. The interior wall has an impingement hole density with a varying hole density pattern. The impingement system also includes a plurality of dividing walls extending from the interior wall to the exterior wall. The interior wall, the exterior wall, and the plurality of dividing walls define a first zone and a second zone. The first zone and the second zone are coupled in flow communication. The impingement hole density is configured to separately meter flow to the first and second zones.

In another aspect, a system for removing heat from an airfoil is provided. The airfoil includes a triple trailing edge pin bank and an exterior wall including an inner surface, an outer surface, and a plurality of exterior wall regions. The exterior wall defines a first interior space and includes a pressure sidewall and a suction sidewall coupled to the pressure sidewall. The suction sidewall and the pressure sidewall define a leading edge and a trailing edge opposite the leading edge. The airfoil further includes a root portion and a tip portion opposite the root portion. The system for removing heat from an airfoil includes an impingement system disposed within the first interior space. The impingement system is configured to channel a coolant stream to the exterior wall. The impingement system includes an interior wall substantially parallel to the exterior wall. The interior wall defines a second interior space. The interior wall further defines a plurality of impingement holes configured to channel a flow of coolant from the second interior space to the first interior space. The interior wall has an impingement hole density with a varying hole density pattern. The impingement system also includes a plurality of dividing walls extending from the interior wall to the exterior wall. The interior wall, the exterior wall, and the plurality of dividing walls define a first zone and a second zone. The first zone and the second zone are coupled in flow communication. The impingement hole density is configured to separately meter flow to the first and second zones.

In still another aspect, a gas turbine system is provided. The gas turbine system includes a compressor section, a combustion section, and a turbine section. The combustion system is coupled in flow communication with the compressor section. The turbine section is coupled in flow communication with the combustion system. The turbine section includes an airfoil including an exterior wall, a root portion, a tip portion, a triple trailing edge pin bank, and an impingement system. The exterior wall includes an inner surface, an outer surface, and a plurality of exterior wall regions and defines a first interior space. The exterior wall also includes a pressure sidewall and a suction sidewall coupled to the pressure sidewall. The suction sidewall and the pressure sidewall define a leading edge and a trailing edge opposite the leading edge. The tip portion is opposite the root portion. The triple trailing edge pin bank is disposed within the first interior space. The impingement system is disposed within the first interior space and is configured to channel a coolant stream to the exterior wall. The impingement system includes an interior wall substantially parallel to the exterior wall. The interior wall defines a second interior space. The interior wall further defines a plurality of impingement holes configured to channel a flow of coolant from the second interior space to the first interior space. The interior wall has an impingement hole density with a varying hole density pattern. The impingement system also includes a plurality of dividing walls extending from the interior wall to the exterior wall. The interior wall, the exterior wall, and the plurality of dividing walls define a first zone and a second zone. The first zone and the second zone are coupled in flow communication. The impingement hole density is configured to separately meter flow to the first and second zones.

DRAWINGS

These and other features, aspects, and advantages of the present disclosure will become better understood when the following detailed description is read with reference to the accompanying drawings in which like characters represent like parts throughout the drawings, wherein.

Figure 1:
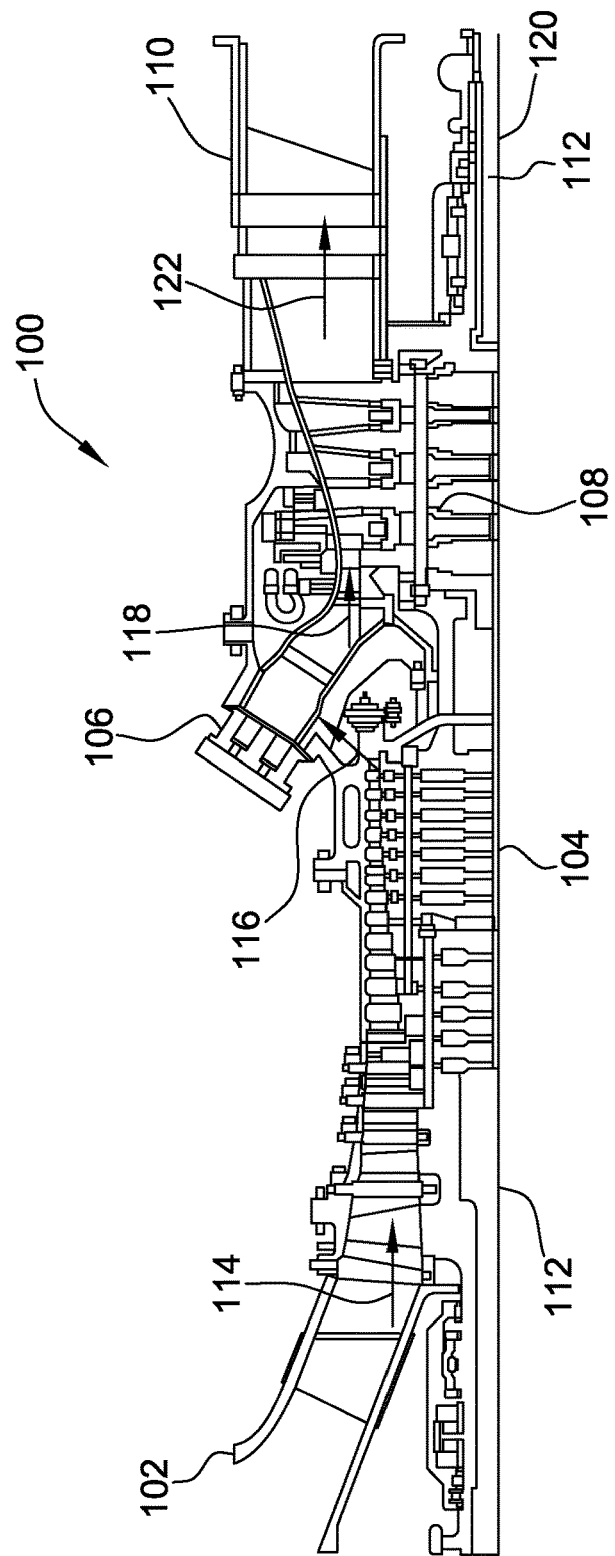
FIG. 1 is a schematic view if an exemplary rotor machine, i.e., a gas turbine engine.

Unless otherwise indicated, the drawings provided herein are meant to illustrate features of embodiments of the disclosure. These features are believed to be applicable in a wide variety of systems comprising one or more embodiments of the disclosure. As such, the drawings are not meant to include all conventional features known by those of ordinary skill in the art to be required for the practice of the embodiments disclosed herein.

DETAILED DESCRIPTION

In the following specification and the claims, reference will be made to a number of terms, which shall be defined to have the following meanings.

The singular forms "a", "an", and "the" include plural references unless the context clearly dictates otherwise.

"Optional" or "optionally" means that the subsequently described event or circumstance may or may not occur, and that the description includes instances where the event occurs and instances where it does not.

Approximating language, as used herein throughout the specification and claims, may be applied to modify any quantitative representation that could permissibly vary without resulting in a change in the basic function to which it is related. Accordingly, a value modified by a term or terms, such as "about", "approximately", and "substantially", are not to be limited to the precise value specified. In at least some instances, the approximating language may correspond to the precision of an instrument for measuring the value. Here and throughout the specification and claims, range limitations may be combined and/or interchanged. Such ranges are identified and include all the sub-ranges contained therein unless context or language indicates otherwise.

As used herein, the terms "axial" and "axially" refer to directions and orientations extending substantially parallel to a longitudinal axis of a gas turbine engine. Moreover, the terms "radial" and "radially" refer to directions and orientations extending substantially perpendicular to the longitudinal axis of the gas turbine engine. In addition, as used herein, the terms "circumferential" and "circumferentially" refer to directions and orientations extending arcuately about the longitudinal axis of the gas turbine engine.

Embodiments of the present disclosure relate to systems that remove heat from gas turbine components. Specifically, in the exemplary embodiment, the gas turbine component includes an airfoil that is provided with an impingement system defined within an exterior wall of an airfoil body. The impingement system and the exterior wall define a post-impingement space therebetween. A plurality of dividers extend from the impingement system to the exterior wall each of which compartmentalize the post-impingement space into a plurality of post-impingement zones. The interior wall further defines a plurality of impingement holes which channel a flow of coolant into the post-impingement zones. The airfoil also includes a trailing edge which includes two cooling channels, a pressure sidewall cooling channel and a suction sidewall cooling channel, separated by a divider and each cooling channel defined by a pin bank. During operation of the gas turbine engine, different regions of the airfoil body may by exposed to different temperatures and flows of a hot fluid depending on the arrangement of the airfoil body within the gas turbine engine. As such, different regions of the airfoil body may experience different exterior wall boundary conditions and have different, local requirements for removing heat from these disparate regions. The arrangement of the exterior wall, impingement system, dividing walls, post-impingement zones, divider, and pin banks within the airfoil body facilitates tuning a velocity, pressure drop, Reynolds Number, and heat transfer coefficient of a coolant stream that is channeled along the inner surface of the exterior wall to remove heat from the airfoil and maintain a consistent and uniform temperature of the airfoil. Tuning the coolant stream to the local heat removal requirements of the airfoil body decreases bleed air extracted from a compressor for the coolant stream channeled through the impingement system, while increasing the coolant stream efficiency within a component region that is traditionally difficult to cool. Gas turbine engine efficiency is increased because less bleed air is extracted for use as the coolant stream.

FIG. 1 is a schematic view of a rotary machine 100, i.e., a turbomachine, and more specifically, a turbine engine. In the exemplary embodiment, turbine engine 100 is a gas turbine engine. Alternatively, turbine engine 100 is any other turbine engine and/or rotary machine, including, and without limitation, a steam turbine engine, an aircraft engine, a wind turbine, and a compressor. In the exemplary embodiment, gas turbine engine 100 includes an air intake section 102, and a compressor section 104 that is coupled downstream from, and in flow communication with, intake section 102. A combustor section 106 is coupled downstream from, and in flow communication with, compressor section 104, and a turbine section 108 is coupled downstream from, and in flow communication with combustion section 106. Downstream from turbine section 108 is an exhaust section 110. Moreover, in the exemplary embodiment, turbine section 108 is rotatably coupled to compressor section 104 through a rotor assembly 112.

In operation, air intake section 102 channels air 114 towards compressor section 104. Compressor section 104 compresses inlet air 114 to higher pressures prior to discharging compressed air 116 towards combustor section 106. Compressed air 116 is channeled to combustor section 106 where it is mixed with fuel (not shown) and burned to generate high temperature combustion gases 118. Combustion gases 118 are channeled downstream towards turbine section 108, wherein after impinging turbine blades (not shown) thermal energy is converted to mechanical rotational energy that is used to drive rotor assembly 112 about a longitudinal axis 120. Often, combustor section 106 and turbine section 108 are referred to as a hot gas section of turbine engine 100. Exhaust gases 122 then discharge through exhaust section 110 to ambient atmosphere.

Figure 2:
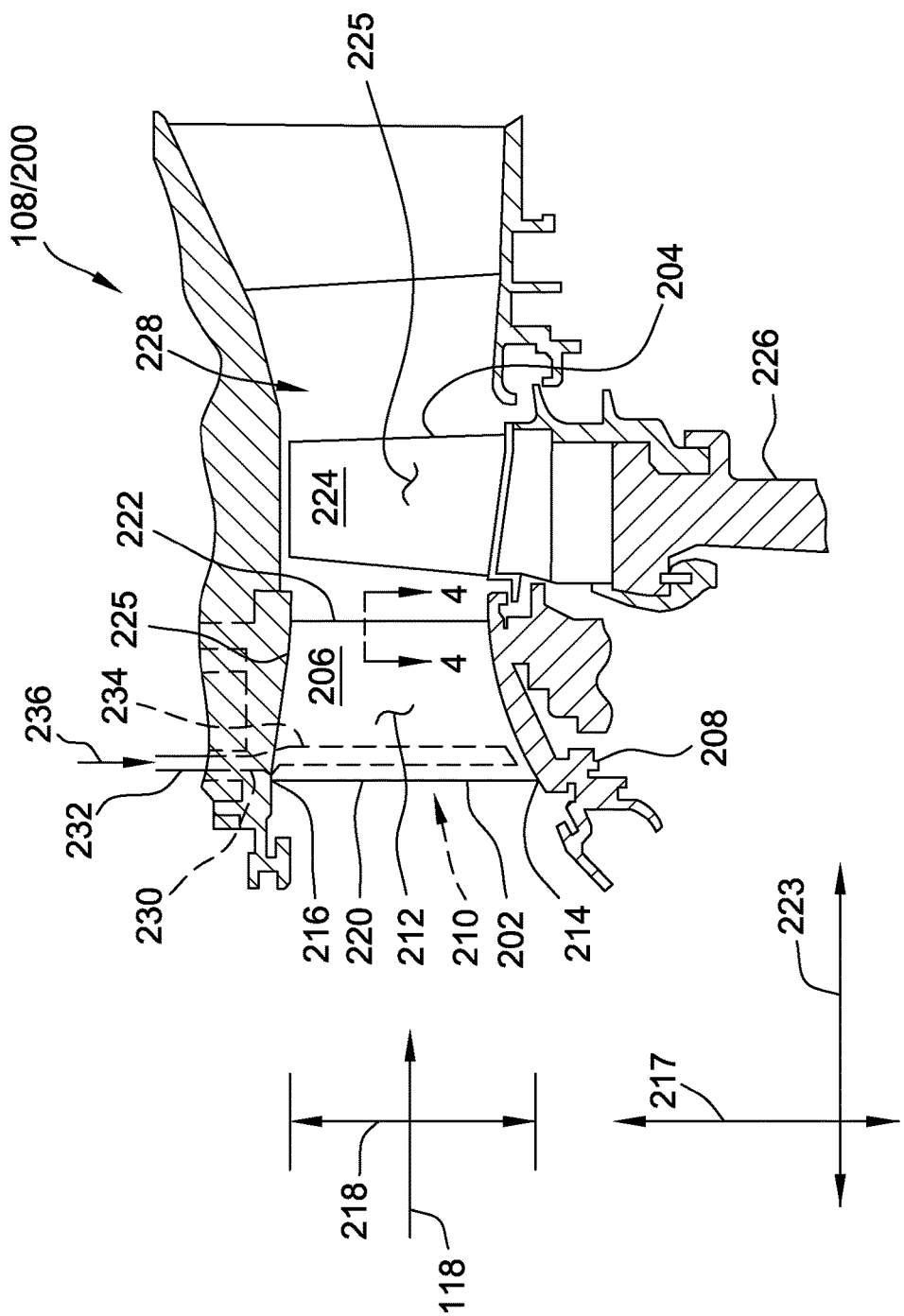
FIG. 2 is an enlarged schematic view of an exemplary first turbine stage of the gas turbine engine shown in FIG. 1.

FIG. 2 is an enlarged schematic view of a first turbine stage 200 of turbine engine 100 (shown in FIG. 1). In the exemplary embodiment, turbine section 108 includes a plurality of stator vanes 202 circumferentially spaced around longitudinal axis 120 (shown in FIG. 1) and a plurality of turbine blades 204 also circumferentially spaced around longitudinal axis 120. A row of stator vanes 202 and a row of turbine blades 204 form a turbine stage, for example first turbine stage 200, that is the first turbine stage downstream of combustor section 106 (shown in FIG. 1). Although a single turbine stage 200 is illustrated in FIG. 2, turbine section 108 may include any number of axially spaced turbine stages.

In the exemplary embodiment, stator vane 202 includes an airfoil 206 that is coupled to a turbine casing 208. Airfoil 206 includes a pressure sidewall 210 coupled to an opposite suction sidewall 212. Pressure sidewall 210 and suction sidewall 212 extend from a root 214 to an opposite tip 216 that defines a radial direction 217 such that airfoil 206 has a radial length 218 which extends in radial direction 217. Pressure sidewall 210 and suction sidewall 212 also define a leading edge 220 and an opposing trailing edge 222. Leading edge 220 and trailing edge 222 define a longitudinal direction 223. Additionally, turbine blade 204 includes an airfoil 224 coupled to rotor assembly 112 via a disk 226. Each airfoil 206 and 224 is coated with a layer 225 of thermal bond coat (TBC). TBC is formed on each airfoil 206 and 224 for further protection of high temperature combustion gases 118. Each airfoil 206 and 224 includes a first target impingement surface 238, a second target impingement surface 240, and a third target impingement surface 242.

During turbine engine 100 operation, stator vane 202 and turbine blade 204 are positioned within a hot gas flow path 228 of turbine casing 208, such that a flow of high temperature combustion gases 118 is channeled therethrough, exposing outer surfaces of stator vane airfoil 206 and turbine blade airfoil 224 to high temperatures and potential corresponding thermal stresses and/or thermal degradation. To at least partially address such thermal exposure, stator vane airfoil 206 and/or any other hot gas section component includes an impingement system 230. Impingement system 230 includes a cooling supply passage 232, defined in turbine casing 208, coupled in flow communication with at least one cooling passage 234 defined within stator vane airfoil 206. A stream of coolant fluid 236 is channeled through impingement system 230 via a coolant stream source (not shown) to facilitate the removing heat from airfoil 206 and maintaining a consistent and uniform temperature gradient of airfoil 206 to increase component efficiency. In the exemplary embodiment, coolant fluid 236 includes pressurized bleed air from compressor section 104 (shown in FIG. 1). Although air is specifically described, in alternative embodiments a fluid other than air may be used to cool components exposed to combustion gases 118. The term fluid as used herein includes any medium or material that flows, including, but not limited to, gas, steam, and air.

Figure 3:
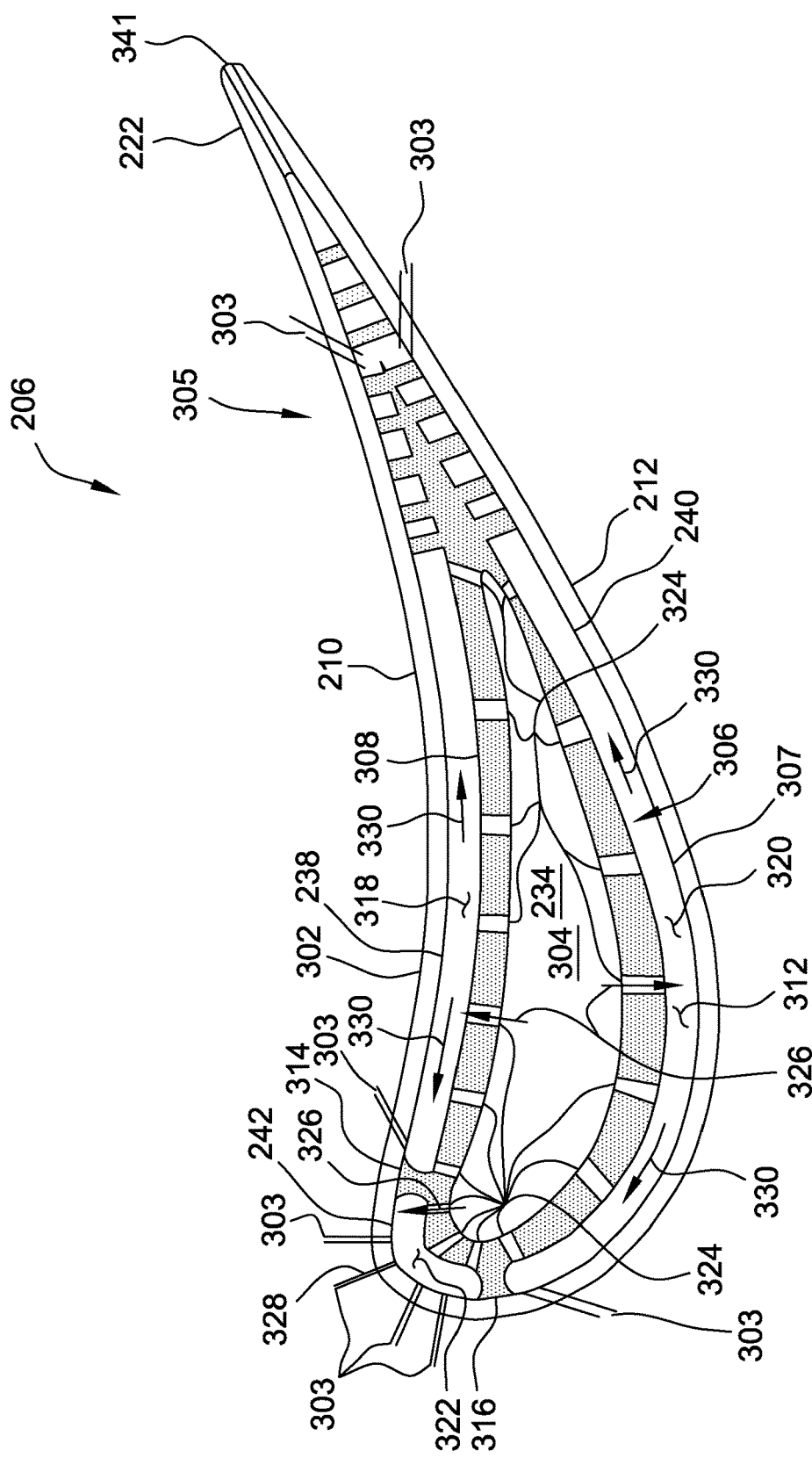
FIG. 3 is a cross-sectional view of an exemplary airfoil shown in FIG. 2.

FIG. 3 is a cross-sectional view of an exemplary stator vane airfoil 206 illustrated in FIG. 2. In the exemplary embodiment, stator vane airfoil 206 includes an exterior wall 302 which includes pressure sidewall 210 coupled to suction sidewall 212 at leading edge 220 and trailing edge 222. Exterior wall 302 defines first interior space 304, which includes the entire interior volume of stator vane airfoil 206. Exterior wall 302 further defines a plurality of film holes 303 configured to channel a flow of coolant out of stator vane airfoil 206 from first interior space 304. Stator vane airfoil 206 also includes a trailing edge cooling system 305 disposed within first interior space 304 proximate to trailing edge 222. In the exemplary embodiment, trailing edge cooling system 305 is a triple trailing edge pin bank. Exterior wall 302 includes an inner surface 307, which includes first target impingement surface 238, second target impingement surface 240, and third target impingement surface 242.

An airfoil impingement system 306 is disposed within first interior space 304. Airfoil impingement system 306 includes an interior wall 308 spaced apart from and substantially parallel to exterior wall 302. Interior wall 308 defines cooling passage 234 with first interior space 304. Exterior wall 302 and interior wall 308 define a post-impingement space 312 between exterior wall 302 and interior wall 308. In the exemplary embodiment, interior wall 308, cooling passage 234, and post-impingement space 312 extend along radial length 218 from root 214 to tip 216. In another embodiment, interior wall 308, cooling passage 234, and post-impingement space 312 extend in radial direction 217 for a length shorter than radial length 218. Interior wall 308, cooling passage 234, and post-impingement space 312 may extend in radial direction 217 for any length between root 214 and tip 216 which enables airfoil impingement system 306 to operate as described herein.

Airfoil impingement system 306 also includes a plurality of dividing walls 314 and 316 extending from interior wall 308 to exterior wall 302. In the exemplary embodiment, plurality of dividing walls 314 and 316 includes first dividing wall 314 and second dividing wall 316. Airfoil impingement system 306 is not limited to only two dividing walls as shown in FIG. 3. In another embodiment, airfoil impingement system 306 may include one, three, or more than three dividing walls. Airfoil impingement system 306 may include any number of dividing walls, which enables airfoil impingement system 306 to operate as described herein.

Dividing walls 314 and 316 compartmentalize post-impingement space 312 into a plurality of post-impingement zones 318, 320, and 322. In the exemplary embodiment, plurality of post-impingement zones 318, 320, and 322 includes first post-impingement zone or pressure side impingement zone 318, second post-impingement zone or suction side impingement zone 320, and third post-impingement zone or leading edge impingement zone 322. Airfoil impingement system 306 is not limited to only three post-impingement zones as shown in FIG. 3. In another embodiment, airfoil impingement system 306 may include one, two, four, or more than four post-impingement zones. Airfoil impingement system 306 may include any number of post-impingement zones which enables airfoil impingement system 306 to operate as described herein. In the exemplary embodiment, dividing walls 314 and 316 and post-impingement zones 318, 320, and 322 extend along radial length 218 from root 214 to tip 216. In another embodiment, dividing walls 314 and 316 and post-impingement zones 318, 320, and 322 extend in radial direction 217 for a length shorter than radial length 218 and shorter than the length interior wall 308, cooling passage 234, and post-impingement space 312 extend in radial direction 217. Dividing walls 314 and 316 and post-impingement zones 318, 320, and 322 may extend in radial direction 217 for any length between root 214 and tip 216 which enables airfoil impingement system 306 to operate as described herein.

Pressure side impingement zone 318 is defined by first target impingement surface 238, interior wall 308, first dividing wall 314, and trailing edge cooling system 305. Suction side impingement zone 320 is defined second target impingement surface 240, interior wall 308, second dividing wall 316, and trailing edge cooling system 305. Leading edge impingement zone 322 is defined third target impingement surface 242, interior wall 308, first dividing wall 314, and second dividing wall 316. Pressure side impingement zone 318 and suction side impingement zone 320 are coupled in flow communication through trailing edge cooling system 305 while leading edge impingement zone 322 is isolated from pressure side impingement zone 318 and suction side impingement zone 320.

Interior wall 308 further defines a plurality of impingement holes 324 configured to channel a flow of coolant into post-impingement space 312 from cooling passage 234. In the exemplary embodiment, impingement holes 324 are cylindrical channels through interior wall 308. However, impingement holes 324 may include any shape which enables airfoil impingement system 306 to operate a described herein. Additionally, airfoil impingement system 306 may include any number of impingement holes which enables airfoil impingement system 306 to operate as described herein. The diameter of impingement holes 324 is one of the primary parameters, along with pressure of a coolant, which determines the flowrate of the coolant through impingement holes 324. In the exemplary embodiment, all impingement holes 324 have the same diameter. However, airfoil impingement system 306 may include impingement holes 324 with different diameters.

Figure 4:
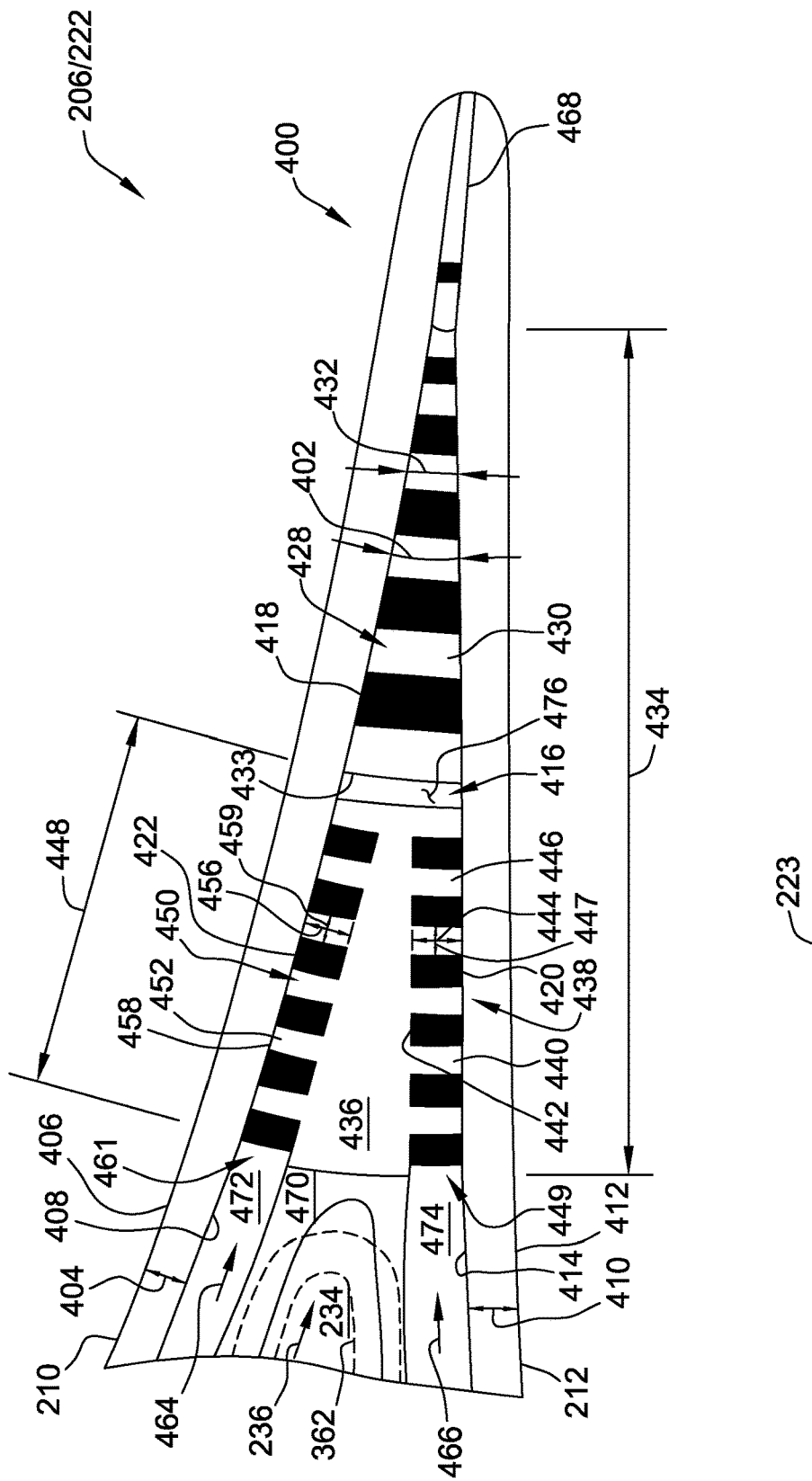
FIG. 4 is a cross-sectional view of an exemplary trailing edge shown in FIG. 2 taken along line 4-4.

FIG. 4 is a cross-sectional view of an exemplary trailing edge 222 taken along line 3-3 as illustrated in FIG. 2. In the exemplary embodiment, pressure sidewall 210 and suction sidewall 212 progressively taper towards each other to form a trailing edge tip section 400 wherein each sidewall 210 and 212 is coupled to each other. Pressure sidewall 210 includes a substantially uniform thickness 404 with an outer surface 406 that is exposed to combustion gases 118 (shown in FIGS. 1 and 2) and an opposite inner surface 408. Similarly, suction sidewall 212 includes a substantially uniform thickness 410 with an outer surface 412 that is exposed to combustion gases 118 and an opposite inner surface 414.

Trailing edge 222 further includes trailing edge cooling system 305. Trailing edge cooling system 305 is included within the overall airfoil impingement system 230 described and referenced in FIGS. 2 and 3. Trailing edge cooling system 305 includes three cooling channels, an aft cooling channel 418, a suction sidewall cooling channel 420, and a pressure sidewall cooling channel 422. Aft cooling channel 418 extends a first distance 424 along longitudinal direction 223 from trailing edge tip section 400 towards leading edge 220 (shown in FIG. 2) and positioned between pressure sidewall 210 and suction sidewall 212. Aft cooling channel 418 includes an aft pin bank 428. Aft pin bank 428 includes a plurality of support projections 430, also referenced as pins, which extend between pressure sidewall inner surface 408 and suction sidewall inner surface 414. In the exemplary embodiment, each support projection 430 is substantially cylindrical in shape and multiple support projections 430 are positioned throughout aft cooling channel 418 extending along first distance 424 and extending along airfoil length 218 (shown in FIG. 2). Trailing edge 222 defines a plurality of trailing edge cooling holes 341. In alternative embodiments, each support projection 430 has any other dimensional profile, for example size and/or shape, that enables aft cooling channel 418 to function as described herein.

In the exemplary embodiment, pressure sidewall inner surface 408 and suction sidewall inner surface 414 taper towards each other and thus are not parallel to one another. As such, the plurality of support projections 430 generally decrease in a length 432 and size, while increasing in spacing, as each support projection 430 is located closer to trailing edge tip section 400. With support projections 430 decreasing in size and increasing in spacing, aft cooling channel 418 has a smoothly varying cross-sectional flow area 433 throughout channel 418 even with the tapering sidewalls 210 and 212.

Suction sidewall cooling channel 420 extends a second distance 434 along longitudinal distance 223 from aft cooling channel 418 towards leading edge 220. Suction sidewall cooling channel 420 is positioned between suction sidewall 212 and a divider 436 that is located between suction sidewall 212 and pressure sidewall 214. Suction sidewall cooling channel 420 includes a suction sidewall pin bank 438. Suction sidewall pin bank 438 includes a plurality of support projections 440, also referenced as pins, which extend between suction sidewall inner surface 414 and a first surface 442 of divider 436. In the exemplary embodiment, each support projection 440 is substantially cylindrical in shape and multiple support projections 440 are positioned throughout suction sidewall cooling channel 420 extending along second distance 434 and extending along airfoil length 218. In alternative embodiments, each support projection 440 has any other shape that enables suction sidewall cooling channel 420 to function as described herein.

In the exemplary embodiment, suction sidewall inner surface 414 and first surface 442 of divider 436 are substantially parallel to one another. As such, each support projection 440 generally has a similar length 444. Additionally, each support projection 440 generally has a similar size and spacing. Support projections 440 are arranged in a plurality of columns 446 extending and equidistantly spaced 447 along second distance 426, wherein each column 446 includes a plurality of rows (not shown) extending along longitudinal length 218. Each support projection 440 is sized approximately equal to each other 440 and equidistantly spaced 447. With support projections 440 having consistent sizing and spacing, suction sidewall cooling channel 420 has a consistent cross-sectional flow area 449 throughout channel 420. In alternative embodiments, suction sidewall cooling channel 420 and suction sidewall pin bank 438 may be sized and shaped in any other way to enable trailing edge cooling system 305 to function as described herein.

Pressure sidewall cooling channel 422 extends a third distance 448 along longitudinal distance 223 from aft cooling channel 418 towards leading edge 220. Pressure sidewall cooling channel 422 is positioned between pressure sidewall 210 and divider 436. Pressure sidewall cooling channel 422 includes a pressure sidewall pin bank 450. Pressure sidewall pin bank 450 includes a plurality of support projections 452, also referenced as pins, which extend between pressure sidewall inner surface 408 and a second surface 454 of divider 436. In the exemplary embodiment, each support projection 452 is substantially cylindrical in shape and multiple support projections 452 are positioned throughout pressure sidewall cooling channel 422 extending along third distance 448 and extending along airfoil length 218. In alternative embodiments, each support projection 452 has any other shape that enables pressure sidewall cooling channel 422 to function as described herein.

In the exemplary embodiment, pressure sidewall inner surface 408 and divider surface 454 are substantially parallel to one another. As such, each support projection 452 generally has a similar length 456. Additionally, each support projection 452 generally has a similar size and spacing. Support projections 452 are arranged in a plurality of columns 458 extending and equidistantly spaced 459 along third distance 448, wherein each column 458 includes a plurality of rows (not shown) extending along longitudinal length 218. Each support projection 452 is sized approximately equal to each other 452 and equidistantly spaced 459. With support projections 452 having consistent size and spacing, pressure sidewall cooling channel 422 has a consistent cross-sectional flow area 461 throughout channel 422. In alternative embodiments, pressure sidewall cooling channel 422 and pressure sidewall pin bank 450 may be sized and shaped in any way to enable trailing edge cooling system 305 to function as described herein.

Airfoil 206, including sidewalls 210 and 212, airfoil impingement system 306, and trailing edge 222, is fabricated via a casting process. For example, a ceramic core (not shown) is formed in the shape of airfoil impingement system 306 and trailing edge cooling system 305 such that a substrate of airfoil 206 may be cast around the ceramic core. The ceramic core is then removed leaving airfoil 206 with airfoil impingement system 306 and trailing edge cooling system 305 formed therein. In the exemplary embodiment, divider 436 is formed as part of this casting process. However, in alternative embodiments, divider 436 may be formed separately and not part of the casting process. In this alternative embodiment, divider 436 is coupled to airfoil 206, and between suction sidewall pin bank 438 and pressure sidewall pin bank 450, after airfoil 206 is cast, wherein divider 436 is brazed 460 to each pin bank 438 and 450. Alternatively, insert divider 436 may be press fit or coupled to airfoil 206 through any other suitable method. Additionally or alternatively, airfoil 206 may be fabricated using any other suitable fabrication method that enables airfoil impingement system 306 and trailing edge cooling system 305 to function as described herein, for example by additive manufacturing or by post cast machining.

In the exemplary embodiment, airfoil impingement system 306 and trailing edge cooling system 305 are illustrated within airfoil 206 of stator vane 202, however, in alternative embodiments, airfoil impingement system 306 and trailing edge cooling system 305 is within a trailing edge that is included within blade airfoil 224 (shown in FIG. 2) and/or any other turbine engine component that includes an airfoil therein.

During turbine engine 100 (shown in FIG. 1) operation, airfoil 206 is exposed to high temperatures combustion gases 118 (shown in FIGS. 1 and 2). To reduce corresponding thermal stresses and/or thermal degradation of airfoil 206, coolant fluid 236 is channeled through cooling passage 234 defined within airfoil 206 to provide a coolant stream therein. For example, coolant fluid 236 is channeled through cooling passage 234 and into impingement holes 324. Impingement holes 324 channel a stream of coolant fluid 326 into post-impingement zones 318, 320, and 322. In the exemplary embodiment, impingement holes 324 form jets of air striking first target impingement surface 238, second target impingement surface 240, and third target impingement surface 242 for impingement cooling, removing heat, and reducing the temperature of each sidewall 210 and 212 which are in contact with combustion gases 118. After contacting first target impingement surface 238, second target impingement surface 240, and third target impingement surface 242, a stream of coolant fluid 328 within leading edge impingement zone 322 is further channeled and/or directed through film holes 303 and out of airfoil 206. Within pressure side impingement zone 318 and suction side impingement zone 320 a stream of coolant fluid 330 is channeled to either film holes 303 or to trailing edge cooling system 305 and exhausted out trailing edge cooling holes 341 in a bidirectional cross-flow pattern. Pressure side impingement zone 318 and suction side impingement zone 320 are coupled in fluid communication through trailing edge cooling system 305.

Figure 5:
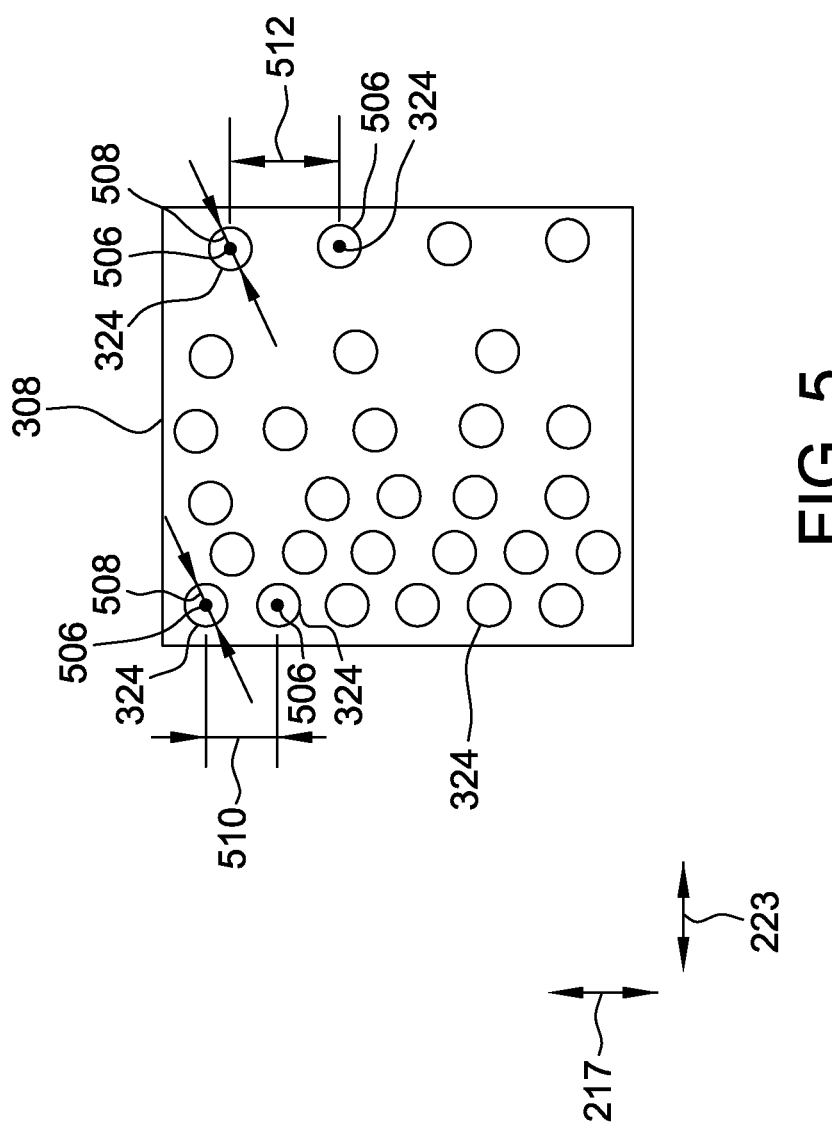
FIG. 5 is a sectional view of interior wall as illustrated in FIG. 2.

FIG. 5 is a sectional view of interior wall 308 as illustrated in FIG. 3. Interior wall 308 includes impingement holes 324. Each impingement hole 324 within interior wall 308 includes a centroid 506 and an impingement hole diameter 508. Impingement holes 324 within interior wall 308 include a varying impingement hole density pattern. The varying impingement hole density pattern may vary by radial direction 217 and longitudinal direction 223. To illustrate the varying impingement hole density pattern, impingement holes 324 depicted in FIG. 5 include a first impingement hole distance 510 and a second impingement hole distance 512. One measure of the density of impingement holes 324 within a localized region of interior wall 308 is impingement hole distance (510 and 512) divided by impingement hole diameter 508. As impingement hole distance (510 and 512) increases, the density of impingement holes 324 decreases. Conversely, as impingement hole distance (510 and 512) decreases, the density of impingement holes 324 increases. As depicted in FIG. 5, first impingement hole distance 510 is less than second impingement hole distance 512. Thus, as depicted in FIG. 5, the impingement hole density of interior wall 308 varies along longitudinal direction 223 and radial direction 217. Varying the impingement hole density of interior wall 308 along longitudinal direction 223 and radial direction 217 is shown for illustration purposes only. The variation of impingement hole density of interior wall 308 is not limited to variations along longitudinal direction 223 and radial direction 217 but may vary in any direction which enables airfoil impingement system 306 to operate as described herein.

The density of impingement holes 324 within localized regions of interior wall 308 is one of the primary parameters which determine the flow rate, velocity, pressure drop, Reynolds Number, and, ultimately, the heat transfer coefficient of coolant fluids 328 and 330. That combination of parameters determines the ultimate heat transfer coefficient and heat transfer rate along first target impingement surface 238, second target impingement surface 240, and third target impingement surface 242.

Tuning the density of impingement holes 324 within localized regions of interior wall 308 along with compartmentalizing post-impingement space 312 into impingement zones 318, 320, and 322 and coupling pressure side impingement zone 318 and suction side impingement zone 320 in fluid communication through trailing edge cooling system 305 facilitates tuning the flow rate, velocity, pressure drop, Reynolds Number, and, ultimately, affecting the heat transfer coefficient between coolant fluids 328 and 330 and exterior wall 302. Tuning the heat transfer coefficient to local requirements allows impingement system 306 to maintain the airfoil at a consistent and uniform temperature which reduces thermal stresses and/or thermal degradation of airfoil 206.

In the exemplary embodiment, as depicted in FIG. 4, a portion 464 of coolant fluid 330 is channeled through pressure sidewall cooling channel 422 to facilitate cooling pressure sidewall 210 along third distance 448. Similarly, a portion 466 of coolant fluid 330 is channeled through suction sidewall cooling channel 420 to facilitate cooling suction sidewall 212 along second distance 434. By positioning divider 436 between pressure sidewall cooling channel 422 and suction sidewall cooling channel 420, each flow area 449 and 461 of suction sidewall cooling channel 420 and pressure sidewall cooling channel 422 is sized to meter and increase a velocity of coolant stream 464 and 466 through trailing edge 222 and thus a Reynolds number to facilitate heat transfer and component cooling. Both coolant stream portions 464 and 466 then are channeled through aft cooling channel 418 to facilitate cooling pressure sidewall 210 and suction sidewall 212 along first distance 424.

Coolant fluid 236 is then exhausted out of trailing edge cooling holes 341 that are defined within trailing edge tip section 400 and spaced along airfoil length 218.

Pressure sidewall thickness 404 is substantially similar through trailing edge 222 including along both first and third distances 424 and 448, and suction sidewall thickness 410 is substantially similar through trailing edge 222 including along both first and second distances 424 and 434. By maintaining a consistent sidewall thickness 404 and 410 throughout trailing edge 222, heat transfer and component cooling are further facilitated because thinner sidewalls 210 and 212 have less thermal resistance.

Suction sidewall cooling channel 420 and pin bank 438 is sized to maintain a substantially constant flow area 449 for coolant stream 466 therethrough. Additionally, pressure sidewall cooling channel 422 and pin banks 450 is sized to maintain a substantially constant flow area 461 for coolant stream 464 therethrough. In the exemplary embodiment, cooling passage 234 is coupled 470 to divider 436 such that pressure sidewall cooling channel 422 and suction sidewall cooling channel 420 have separate and different source pressure requirements 472 and 474. For example, cooling fluid 236 that is used for impingement cooling on pressure side 210 is channeled 464 directly to pressure side cooling channel 422 has a first pressure 472, while cooling fluid 236 that is used for impingement cooling on suction side 212 is channeled 466 directly to suction side cooling channel 420 has a second pressure 474. As such, suction sidewall support projections 440 are not sized equal to pressure sidewall support projection 452, such that suction sidewall flow area 449 is not equal to pressure sidewall flow area 461, to facilitate maintaining similar velocity and metering, and thus uniform heat transfer for coolant streams 464 and 466. However, both pressure sidewall cooling channel 422 and suction sidewall cooling channel 420 have a similar sink pressure requirement 476, which is also the source pressure requirement for aft cooling channel 418. As such, the combined exit flow area of pressure sidewall cooling channel 422 and suction sidewall cooling channel 420 is approximately equal to, or slightly greater than, aft cooling channel 418 inlet flow area.

In alternative embodiments, cooling passage 234 is not connected to and is separate from divider 436, thus both pressure sidewall cooling channel 422 and suction sidewall cooling channel 420 have similar inlet pressures 472 and 474 for coolant streams 464 and 466. As such, suction sidewall support projections 440 are sized substantially equal to pressure sidewall support projection 452, and suction sidewall flow area 449 is substantially equal to pressure sidewall flow area 461 to facilitate similar velocity and metering, and thus uniform heat transfer for coolant streams 464 and 466. Additionally, both pressure sidewall cooling channel 422 and suction sidewall cooling channel 420 have a similar sink pressure requirement 476, which is also the source pressure requirement for aft cooling channel 418. As such, the combined exit flow area of pressure sidewall cooling channel 422 and suction sidewall cooling channel 420 is approximately equal to, or slightly greater than, aft cooling channel 418 inlet flow area 433.

In the exemplary embodiment, pressure sidewall cooling channel 422 and suction sidewall cooling channel 420 are illustrated as having similar support projection 440 and 452 sizing, span, and spacing, as well as, similar cross-sectional flow areas. However, in alternative embodiments, pressure sidewall cooling channel 422 and suction sidewall cooling channel 420 may be different from one another to facilitate cooling the respective sidewalls 210 or 212. For example, pressure sidewall support projections 452 may be sized larger than suction sidewall support projections 440.

The above-described embodiments provide an efficient system for removing heat and cooling gas turbine components. Specifically, in the exemplary embodiment, the gas turbine component includes an airfoil that is provided with an impingement system defined within an airfoil body. The impingement system includes an interior wall defining an interior space. The interior wall and the exterior wall define a post-impingement space therebetween. A plurality of dividers extend from the interior wall to the exterior wall each of which compartmentalize the post-impingement space into a plurality of post-impingement zones. The interior wall further defines a plurality of impingement holes which channel a flow of coolant into the post-impingement zones. The post-impingement zones channel the flow of coolant along an inner surface of the exterior wall to remove heat from the exterior wall. During operation of the gas turbine engine, different regions of the airfoil body may by exposed to different temperatures and flows of a hot fluid depending on the arrangement of the airfoil body within the gas turbine engine. As such, different regions of the airfoil body may experience different exterior wall boundary conditions and have different, local requirements for removing heat from these disparate regions. Compartmentalizing the post-impingement space into post-impingement zones allows the flow rate and velocity of the flow of coolant to be independently tuned to the local heat removal requirements of the different regions of the airfoil body and maintaining a consistent and uniform temperature of the airfoil body.

An exemplary technical effect of the systems and methods described herein includes at least one of: (a) removing heat from a gas turbine engine component that includes an airfoil; (b) maintaining a consistent temperature with the airfoil to improve component efficiency; (c) reduce amount of coolant fluids extracted from a compressor; (d) increase the coolant stream efficiency with a component region that is traditionally difficult to cool; and (e) increase gas turbine engine efficiency.

Exemplary embodiments of systems and methods for removing heat from a gas turbine engine component are described above in detail. The methods and systems are not limited to the specific embodiments described herein, but rather, components of systems and/or steps of the methods may be utilized independently and separately from other components and/or steps described herein. For example, the method may also be used in combination with other turbine components, and are not limited to practice only with the gas turbine engine stator vanes as described herein. Rather, the exemplary embodiment can be implemented and utilized in connection with many other gas turbine engine applications.

Although specific features of various embodiments of the present disclosure may be shown in some drawings and not in others, this is for convenience only. In accordance with the principles of embodiments of the present disclosure, any feature of a drawing may be referenced and/or claimed in combination with any feature of any other drawing.

This written description uses examples to disclose the embodiments of the present disclosure, including the best mode, and also to enable any person skilled in the art to practice embodiments of the present disclosure, including making and using any devices or systems and performing any incorporated methods. The patentable scope of the embodiments described herein is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. An airfoil comprising:
an exterior wall comprising an inner surface, an outer surface, and a plurality of exterior wall regions, said exterior wall defining a first interior space, said exterior wall further comprising:
a pressure sidewall; and
a suction sidewall coupled to said pressure sidewall, wherein said suction sidewall and said pressure sidewall define a leading edge and a trailing edge opposite said leading edge;
a root portion;
a tip portion opposite said root portion;
a triple trailing edge pin bank disposed within said first interior space; and
an impingement system disposed within said first interior space, said impingement system configured to channel a coolant stream to said exterior wall, said impingement system comprising:
an interior wall substantially parallel to said exterior wall, said interior wall defining a second interior space, said interior wall further defines a plurality of impingement holes configured to channel a flow of coolant from said second interior space to said first interior space, said interior wall having an impingement hole density having a varying hole density pattern; and
a plurality of dividing walls extending from said interior wall to said exterior wall, said interior wall, said exterior wall, and said plurality of dividing walls define a first zone and a second zone, said first zone and said second zone coupled in flow communication, wherein said impingement hole density is configured to separately meter flow to said first and second zones, wherein said exterior wall further defines a plurality of film holes configured to separately meter flow to said first and second zones by channeling the flow of coolant from said first interior space.

2. The airfoil in accordance with claim 1, wherein said first and second zones configured to channel said flow of coolant to said triple trailing edge pin bank, said flow of coolant within said triple trailing edge pin bank having a pressure drop, said pressure drop configured to separately meter flow to said first and second zones.

3. The airfoil in accordance with claim 2, wherein said interior wall, said exterior wall, and said plurality of dividing walls further define a third zone, said plurality of dividing walls comprises a first dividing wall and a second dividing wall, said first dividing wall separating said first zone from said third zone and said second dividing wall separating said second zone from said third zone, said first, second, and third zones having a compartmentalized arrangement, said compartmentalized arrangement configured to separately meter flow to said first, second, and third zones.

4. The airfoil in accordance with claim 3, wherein said plurality of impingement holes and said plurality of film holes are arranged to channel the flow of coolant within said first zone, said second zone, and said third zone in a bidirectional crossflow pattern.

5. The airfoil in accordance with claim 1, wherein said triple trailing edge pin bank comprises:
a first plurality of projections coupled to said suction sidewall adjacent said trailing edge and extending from said suction sidewall towards said pressure sidewall;
a second plurality of projections coupled to said pressure sidewall adjacent said trailing edge and extending from said pressure sidewall towards said suction sidewall; and
a divider coupled to said first plurality of projections and said second plurality of projections and extending within a space defined between said first plurality of projections and said second plurality of projections such that a first cooling channel is defined adjacent said suction sidewall and a second cooling channel is defined adjacent said pressure sidewall, said first cooling channel and said second cooling channel configured to receive at least one coolant stream, said first plurality of projections configured to meter the at least one coolant stream through said first cooling channel and said second plurality of projections configured to meter the at least one coolant stream through said second cooling channel.

6. A system for removing heat from an airfoil, the airfoil including a triple trailing edge pin bank and an exterior wall including an inner surface, an outer surface, and a plurality of exterior wall regions, the exterior wall defining a first interior space, the exterior wall comprising a pressure sidewall, a suction sidewall coupled to the pressure sidewall, wherein the suction sidewall and the pressure sidewall define a leading edge and a trailing edge opposite the leading edge, the airfoil further including a root portion and a tip portion opposite the root portion, said system comprising:
an impingement system disposed within the first interior space, said impingement system configured to channel a coolant stream to the exterior wall, said impingement system comprising:
an interior wall substantially parallel to the exterior wall, said interior wall defining a second interior space, said interior wall further defines a plurality of impingement holes configured to channel a flow of coolant from said second interior space to the first interior space, said interior wall having an impingement hole density having a varying hole density pattern; and
a plurality of dividing walls extending from said interior wall to the exterior wall, said interior wall, the exterior wall, and said plurality of dividing walls define a first zone and a second zone, said first zone and said second zone coupled in flow communication, wherein said impingement hole density is configured to separately meter flow to said first and second zones, wherein the exterior wall further defines a plurality of film holes configured to separately meter flow to said first and second zones by channeling the flow of coolant from said first interior space.

7. The system for removing heat from an airfoil in accordance with claim 6, wherein said first and second zones configured to channel said flow of coolant to said triple trailing edge pin bank, said flow of coolant within said triple trailing edge pin bank having a pressure drop, said pressure drop configured to separately meter flow to said first and second zones.

8. The system for removing heat from an airfoil in accordance with claim 7, wherein said interior wall, the exterior wall, and said plurality of dividing walls further define a third zone, said plurality of dividing walls comprises a first dividing wall and a second dividing wall, said first dividing wall separating said first zone from said third zone and said second dividing wall separating said second zone from said third zone, said first, second, and third zones having a compartmentalized arrangement, said compartmentalized arrangement configured to separately meter flow to said first, second, and third zones.

9. The system for removing heat from an airfoil in accordance with claim 8, wherein said plurality of impingement holes and said plurality of film holes are arranged to channel the flow of coolant within said first zone, said second zone, and said third zone in a bidirectional crossflow pattern.

10. A gas turbine system, said gas turbine system comprising:
   a compressor section;
   a combustion system coupled in flow communication with said compressor section; and
   a turbine section coupled in flow communication with said combustion system, wherein said turbine section comprises:
      an airfoil comprising:
         an exterior wall comprising an inner surface, an outer surface, and a plurality of exterior wall regions, said exterior wall defining a first interior space, said exterior wall further comprising:
            a pressure sidewall; and
            a suction sidewall coupled to said pressure sidewall, wherein said suction sidewall and said pressure sidewall define a leading edge and a trailing edge opposite said leading edge;
         a root portion;
         a tip portion opposite said root portion;
         a triple trailing edge pin bank disposed within said first interior space; and
         an impingement system disposed within said first interior space, said impingement system configured to channel a coolant stream to said exterior wall, said impingement system comprising:
            an interior wall substantially parallel to said exterior wall, said interior wall defining a second interior space, said interior wall further defines a plurality of impingement holes configured to channel a flow of coolant from said second interior space to said first interior space, said interior wall having an impingement hole density having a varying hole density pattern; and
            a plurality of dividing walls extending from said interior wall to said exterior wall, said interior wall, said exterior wall, and said plurality of dividing walls define a first zone and a second zone, said first zone and said second zone coupled in flow communication, wherein said impingement hole density is configured to separately meter flow to said first and second zones, wherein said exterior wall further defines a plurality of film holes configured to separately meter flow to said first and second zones by channeling the flow of coolant from said first interior space.

11. The gas turbine in accordance with claim 10, wherein said first and second zones configured to channel said flow of coolant to said triple trailing edge pin bank, said flow of coolant within said triple trailing edge pin bank having a pressure drop, said pressure drop configured to separately meter flow to said first and second zones.

12. The gas turbine in accordance with claim 11, wherein said interior wall, said exterior wall, and said plurality of dividing walls further define a third zone, said plurality of dividing walls comprises a first dividing wall and a second dividing wall, said first dividing wall separating said first zone from said third zone and said second dividing wall separating said second zone from said third zone, said first, second, and third zones having a compartmentalized arrangement, said compartmentalized arrangement configured to separately meter flow to said first, second, and third zones.

13. The gas turbine in accordance with claim 12, wherein said plurality of impingement holes and said plurality of film holes are arranged to channel the flow of coolant within said first zone, said second zone, and said third zone in a bidirectional crossflow pattern.

14. The gas turbine in accordance with claim 10, wherein said triple trailing edge pin bank comprises:
   a first plurality of projections coupled to said suction sidewall adjacent said trailing edge and extending from said suction sidewall towards said pressure sidewall;
   a second plurality of projections coupled to said pressure sidewall adjacent said trailing edge and extending from said pressure sidewall towards said suction sidewall; and
   a divider coupled to said first plurality of projections and said second plurality of projections and extending within a space defined between said first plurality of projections and said second plurality of projections such that a first cooling channel is defined adjacent said suction sidewall and a second cooling channel is defined adjacent said pressure sidewall, said first cooling channel and said second cooling channel configured to receive at least one coolant stream, said first plurality of projections configured to meter the at least one coolant stream through said first cooling channel and said second plurality of projections configured to meter the at least one coolant stream through said second cooling channel.

* * * * *